(12) United States Patent
Behrendt et al.

(10) Patent No.: US 10,209,089 B2
(45) Date of Patent: Feb. 19, 2019

(54) AUTOMATED IMAGE LABELING FOR VEHICLES BASED ON MAPS

(71) Applicant: Robert Bosch GmbH, Stuttgart (DE)

(72) Inventors: Karsten Behrendt, Mountain View, CA (US); Jonas Witt, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 15/477,993

(22) Filed: Apr. 3, 2017

(65) Prior Publication Data

US 2018/0283892 A1    Oct. 4, 2018

(51) Int. Cl.
| | |
|---|---|
| *G01C 21/36* | (2006.01) |
| *G06K 9/00* | (2006.01) |
| *H04N 7/18* | (2006.01) |
| *G06T 7/33* | (2017.01) |
| *G06K 9/66* | (2006.01) |
| *G06F 17/30* | (2006.01) |

(52) U.S. Cl.
CPC ..... *G01C 21/3673* (2013.01); *G01C 21/3647* (2013.01); *G06F 17/30241* (2013.01); *G06F 17/30268* (2013.01); *G06F 17/30274* (2013.01); *G06K 9/00718* (2013.01); *G06K 9/00798* (2013.01); *G06K 9/00805* (2013.01); *G06K 9/66* (2013.01); *G06T 7/344* (2017.01); *H04N 7/183* (2013.01)

(58) Field of Classification Search
CPC .......... B60W 2420/42; G06K 9/00798; G06K 9/00805; G08G 1/165; G08G 1/166; G08G 1/167
See application file for complete search history.

(56) References Cited

U.S. PATENT DOCUMENTS

| | | |
|---|---|---|
| 6,222,583 B1 | 4/2001 | Matsumura et al. |
| 9,052,207 B2 | 6/2015 | Miksa et al. |
| 9,129,161 B2 | 9/2015 | Kgosta et al. |
| 9,435,653 B2 | 9/2016 | Zeng et al. |

(Continued)

OTHER PUBLICATIONS

International Search Report for Application No. PCT/EP2018/053476 dated May 24, 2018 (3 pages).

*Primary Examiner* — Manuchehr Rahmjoo
(74) *Attorney, Agent, or Firm* — Michael Best & Friedrich LLP

(57) ABSTRACT

A method and system for navigating a vehicle using automatically labeled images. The system includes a camera configured to capture an image of a roadway and an electronic processor communicatively connected to the camera. The electronic processor is configured to load a map that includes a first plurality of features and receive the image. The image includes a second plurality of features. The electronic processor is further configured to project the map onto the image; detect the second plurality of features within the image; and align the map with the image by aligning the first plurality of features with the second plurality of features. The electronic processor is further configured to copy a label describing one of the first plurality of features onto a corresponding one of the second plurality of features to create a labelled image and to use the labelled image to assist in navigation of the vehicle.

14 Claims, 4 Drawing Sheets

(56) References Cited

U.S. PATENT DOCUMENTS

2010/0104199 A1* 4/2010 Zhang ............... G06K 9/00798
                                                            382/199
2015/0286868 A1   10/2015 Flores et al.
2015/0371095 A1   12/2015 Hartmann et al.
2016/0004915 A1    1/2016 Chen et al.
2016/0189004 A1    6/2016 Knastassov et al.
2017/0039436 A1    2/2017 Chen et al.

* cited by examiner

AUTOMATED IMAGE LABELING FOR VEHICLES BASED ON MAPS

BACKGROUND

High-definition maps that include information regarding objects located within the high-definition map are used in driving-assist systems. These maps are used to bridge the gap between state-of-the-art, real-time lane detection devices and reliability and range of object detection requirements (which often cannot be met by existing lane detection devices alone) for semi-autonomous driving.

SUMMARY

High-definition maps provide, among other things, information to assist in performing vehicle maneuvers. In particular, the high definition maps provide information relating to position and characteristics of objects such as roads, lane markings, and roadway infrastructure. In some instances, high-definition maps also assist a driver by providing information about landmarks and areas of interest in relation to the vehicle. In some cases, semi-autonomous vehicles may perform some navigation and maneuvering based, at least in part, on the information about objects location within the high-definition maps. For example, the vehicle may use the lane markings to travel within a single lane of traffic, to determine a number of traffic lanes on the roadway, to perform lane changes, and others.

Reliable lane detection is necessary for proper functioning of driver assistance systems, driver safety functions, and fully automated vehicles. Deep learning provides a highly accurate technique for training a vehicle system to detect lane markers. However, deep learning also requires vast amounts of labeled data to properly train the vehicle system. As described below, a neural network is trained for detecting lane markers in camera images without manually labeling any images.

To achieve this, high-definition maps for automated driving are projected into camera images and the vehicle system corrects for misalignments due to inaccuracies in localization and coordinate frame transformations. The corrections may be performed by calculating the offset between objects or features within the high-definition map and detected objects in the camera images. By using object detections in camera images for refining the projections, labels of objects within the camera images may be accurately determined based on pixel location. After an optional, visual quality check, projected lane markers are used for training a fully convolutional network to segment lane markers in images. The optional visual quality check may be performed at a much higher rate than manually labelling individual images. For example, a single worker may quality check 20,000 automatically generated labels within a single day. As a result, the convolutional network may be trained based on only automatically generated labels. Additionally, the detections of objects within the camera images may be based solely on gray-scale mono camera inputs without any additional information. The resulting trained neural network may detect lane markers at distances of approximately 150 meters on a 1 Megapixel camera.

Embodiments provide an automated system that generates labels for objects within camera images. In some embodiments, the automated system generates labels that identify lane markers within an image based at least in part on map data.

In particular, one embodiment provides a method of navigation for a vehicle using automatically labeled images. The method includes loading a map that includes a first plurality of features into an electronic processor of the vehicle and capturing an image that includes a second plurality of features with a camera of the vehicle. The method further includes projecting the map onto the image; detecting, with the electronic processor, the second plurality of features within the image; and aligning the map with the image by aligning the first plurality of features with the second plurality of features. The method further includes copying a label describing one of the first plurality of features onto a corresponding one of the second plurality of features to create a labelled image and using the labelled image to assist in navigation of the vehicle.

Another embodiment provides a system for navigating a vehicle using automatically labeled images. The system includes a camera configured to capture an image of a roadway and an electronic processor communicatively connected to the camera. The electronic processor is configured to load a map that includes a first plurality of features and receive the image. The image includes a second plurality of features. The electronic processor is further configured to project the map onto the image; detect the second plurality of features within the image; and align the map with the image by aligning the first plurality of features with the second plurality of features. The electronic processor is yet further configured to copy a label describing one of the first plurality of features onto a corresponding one of the second plurality of features to create a labelled image and to use the labelled image to assist in navigation of the vehicle.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
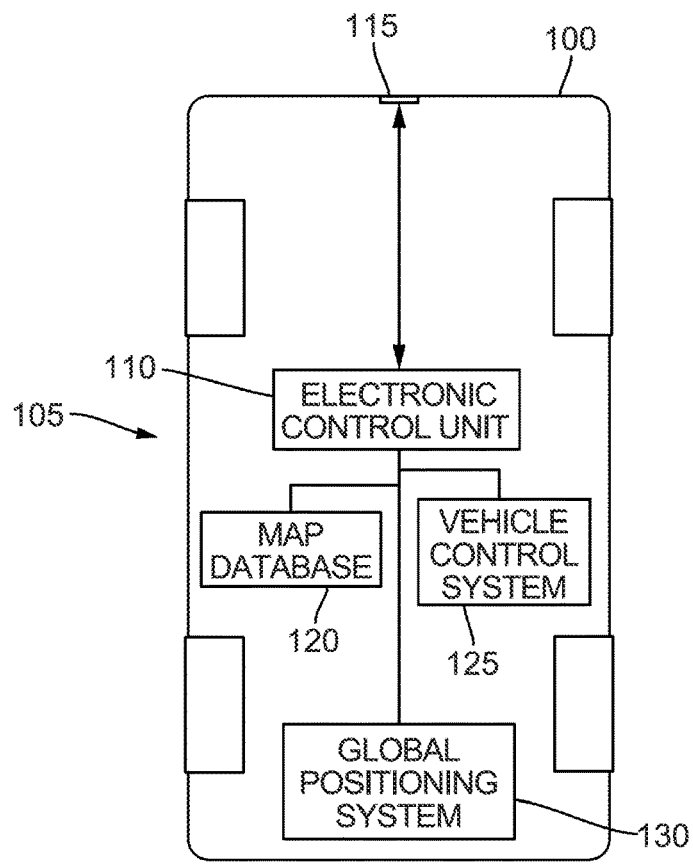
FIG. 1 is a block diagram of a vehicle equipped with an automated system for labelling objects within a camera image according to one embodiment.

FIG. 1 illustrates an embodiment of a vehicle 100 equipped with a system 105 for labelling objects within a camera image according to one embodiment. The vehicle 100, although illustrated as a four-wheeled vehicle, encompasses various types and designs. For example, the vehicle 100 may include an automobile, a motorcycle, a truck, a bus, a semi-tractor, and others. In the example illustrated, the system 105 includes an electronic control unit (ECU) 110, at least one sensor 115, a map database 120, a vehicle control system 125, and a global positioning system (GPS) 130. These components are described in more detail below.

The electronic control unit 110 may be communicatively connected to the sensor 115, the map database 120, the vehicle control system 125, and the global positioning system 130 via different and various mechanisms or protocols. For example, the electronic control unit 110 and the sensor 115 may be directly wired, wired through a communication bus, or wirelessly connected (for example, via a wireless network). The electronic control unit 110 is configured to, among other things, receive information from the sensor 115 regarding the area surrounding the vehicle 100, receive high-definition maps with labelled objects from the map database 120, and generate requests and information related to navigation and maneuvering for the vehicle control system 125. In particular, the electronic control unit 110 may determine the location or position of the vehicle 100 based at least in part on the global positioning system 130. The electronic control unit 110 may obtain an initial location via the global positioning system 130 and then optimize or refine the location using the sensor 115 and detected landmarks.

The sensor 115, although illustrated as a single sensor for simplicity, may include various types and styles of sensors. For example, the sensor 115 may include one or more sensors and sensor arrays that are configured to use radar, lidar, ultrasound, infrared, and others. The sensor 115 may also include one or more optical cameras. In some embodiments, the sensor 115 is positioned with a field of view that includes lane markings on either side of the vehicle 100. The sensor 115 is configured to capture images of objects around the vehicle 100. In particular, the sensor 115 is configured to capture images of lane markings around the vehicle 100.

The map database 120 may be of various different types and use various different technologies. In one example, the map database 120 is located within the vehicle 100 and updatable via external communications (for example, via a wide area network). In another example, the map database 120 is located externally from the vehicle 100 (for example, at a central server). In this instance, the vehicle 100 downloads high-definition maps for the map database 120 for use by the electronic control unit 110. In some cases, the vehicle 100 uploads high-definition maps to the map database 120 that are captured by the sensor 115. As a consequence, the map database 120 includes a plurality of high-definition maps that may be generated by the electronic control unit 110, by similar systems of other vehicles, or by manual methods. The high-definition maps contained in the map database 120 provide characteristics of the objects within the high-definition map including position of lane markings. The high-definition maps along with images from the sensor 115 are used to train the electronic control unit 110 to detect and label objects within the images with high precision as discussed below.

The vehicle control system 125 is configured to receive instructions and information from the electronic control unit 110 to aid in navigation and control of the vehicle 100. The vehicle control system 125 is configured to perform autonomous driving and various automatic vehicle maneuvers based, at least in part on signals received from the electronic control unit 110. In some embodiments, the vehicle control system 125 is communicatively connected to the sensor 115 and the global positioning system 130 independently of the electronic control unit 110. In some embodiments, the vehicle control system 125 and the electronic control unit 110 are incorporated into a single control unit.

Figure 2:
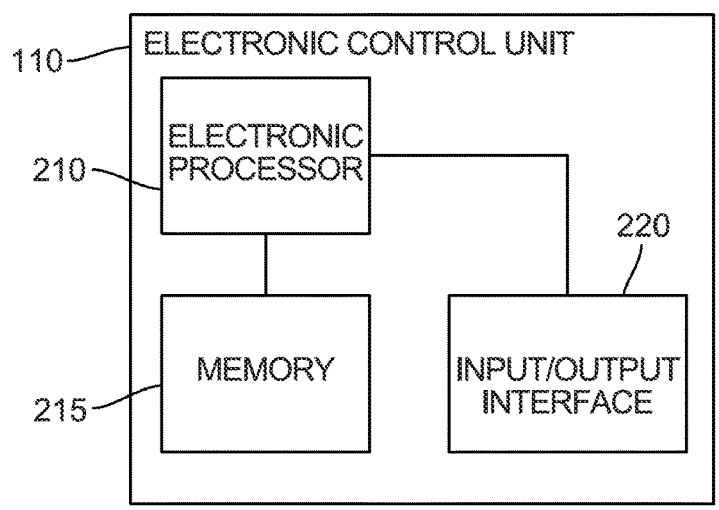
FIG. 2 is a block diagram of an electronic control unit of the system of FIG. 1 according to one embodiment.

FIG. 2 is a block diagram of the electronic control unit 110 of the system 105 according to one embodiment. The electronic control unit 110 includes a plurality of electrical and electronic components that provide power, operational control, and protection to the components and modules within the electronic control unit 110. The electronic control unit 110 includes, among other things, an electronic processor 210 (such as a programmable electronic microprocessor, microcontroller, or similar device), a memory 215 (for example, non-transitory, machine readable memory), and an input/output interface 220. In some embodiments, the electronic control unit 110 includes additional, fewer, or different components. For example, the electronic control unit 110 may be implemented in several independent electronic control units or modules each configured to perform specific steps or functions of the electronic control unit 110.

The electronic processor 210, in coordination with the memory 215, the input/output interface 220, and other components of the electronic control unit 110, is configured to perform the processes and methods discussed herein. For example, the electronic processor 210 is configured to retrieve from memory 215 and execute, among other things, instructions related to receiving camera images from the sensor 115, receiving map data from the map database 120, and generating labelled camera images based on the receive camera images and the map data. The input/output interface 220 may include one or more input and output modules for communicating with the other components of the system 105 as well as other components of the vehicle 100. For example, the input/output interface 220 is configured to communicate with the sensor 115, the map database 120, and the vehicle control system 125.

It should be noted that multiple functions including creating high-definition maps and using high-definition maps to generate labeled camera images are described as being performed by the electronic processor 210. However, these functions, as well as others described herein, may be performed individually and independently by multiple electronic processors and multiple vehicles. For example, in some embodiments, one or more vehicles generate a plurality of high-definition maps and upload the high-definition maps to a centralized map database. In this instance, other vehicles, such as vehicle 100, download the high-definition maps and generate high-accuracy, labelled images using the high-definition maps. In particular, the labelled camera images may be generated by the electronic processor 210 by training the electronic processor 210 with the high-definition maps for detection and recognition of objects. The labelled camera images may then be used by the vehicle control system 125 to navigate and maneuver the vehicle 100. In operation, the electronic control unit 110 uses the high-definition maps to improve real-time detection of objects by using them to generate large labeled data sets of static objects including, for example, lane markings.

In good environmental conditions, the electronic control unit 110 can detect static objects at short ranges with high accurately for mapping operation using, for example, high accuracy object detection sensors (for example, light detection and ranging (LIDAR)) and can generate high-definition maps. The high-definition maps may include various features and positional information including roadway infrastructure and lane markers. Due to the static nature of the mapped objects, the high-definition maps may be projected into sensor frames (for example, camera image frames) in poor environmental conditions to assist in detection and provide longer detection ranges for the sensor 115.

Figure 3:
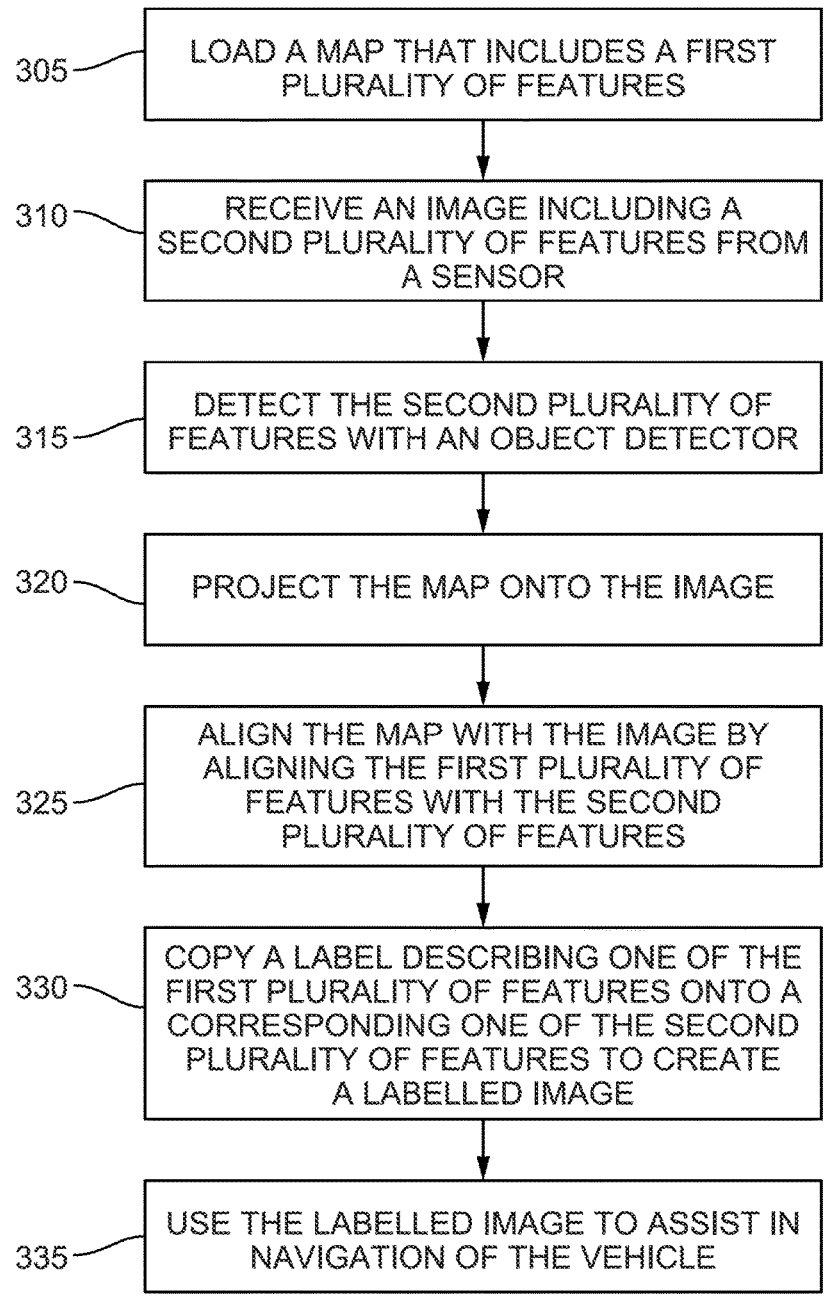
FIG. 3 is a flowchart of a method of operating the system of FIG. 1 according to one embodiment.

FIG. 3 illustrates a method of using automatically labeled images according to one embodiment. The method includes using the automatically labelled images to train an object detector (for example, a deep-learning, neural network) within the electronic processor 210. The method also includes using the automatically labelled images for navigation of the vehicle 100. In the example illustrated, the electronic processor 210 loads a high-definition map that includes a first plurality of features (block 305). The electronic processor 210 receives the image including a second plurality of features from the sensor 115 (block 310). In some embodiments, for example, the electronic processor 210 receives a camera image from a vehicle camera as the vehicle is operating. The electronic processor 210 then detects the second plurality of features with an object detector (block 315). As described below, the object detector may be a simple preprogrammed detector. The electronic processor 210 then projects the high-definition map onto the image (block 320). The electronic processor 210 aligns the high-definition map with the image by aligning the first plurality of features with the second plurality of features (block 325). The electronic processor 210 then copies a label describing one of the first plurality of features onto a corresponding one of the second plurality of features to create a labelled image (block 330). The labelled image is then used to assist in navigation of the vehicle 100 (block 335).

In some embodiments, the method illustrated in FIG. 3 is repeated performed over many iterations. In this instance, the object detector is replaced with a neural network or is simply an untrained neural network that is trained for subsequent iterations (for example, after the first iteration). After training the object detector, detecting the second plurality of features within the second image is done with the trained detector (see block 315). Once the method is completed in the subsequent iteration, a labelled image is generated based on updated detections. This generates an updated image with increased accuracy of labelled images. The neural network is thereby trained to improve object detection and alignment based on the labelled camera images. This process is explained in additional detail below.

Figure 4:
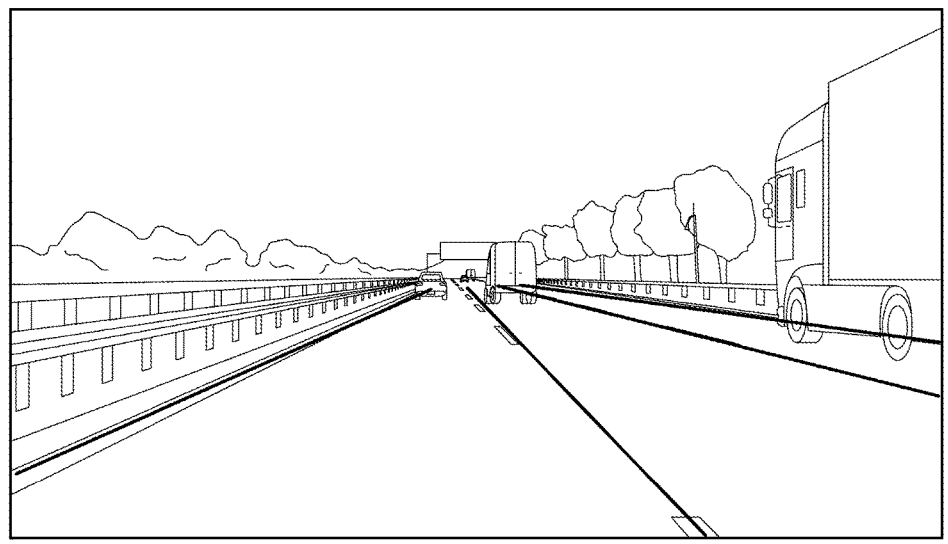
FIG. 4 is an example image of lane markers and an initial estimate of the position of the lane markers that is generated by the system of FIG. 1.

Prior to projection of the high-definition map onto the image (see block 315), the precise pose of the sensor 115 is determined. The sensor pose with respect to the high-definition map is then determined. FIG. 4 illustrates an example of a high-definition map projected into a camera image frame. Finding the sensor pose with respect to the high-definition map is performed using localization techniques. However, for the process of labelling the camera images (see block 330), full time-series of measurements may be performed during an offline graph optimization. The labeling process consists of three generalized steps: 1) Coarse pose graph alignment using only GPS and relative motion constraints; 2) Lane alignment by adding lane marker constraints to the graph; and 3) Pixel-accurate refinement in image space using reprojection optimization per image starting from the corresponding graph pose.

Figure 5:
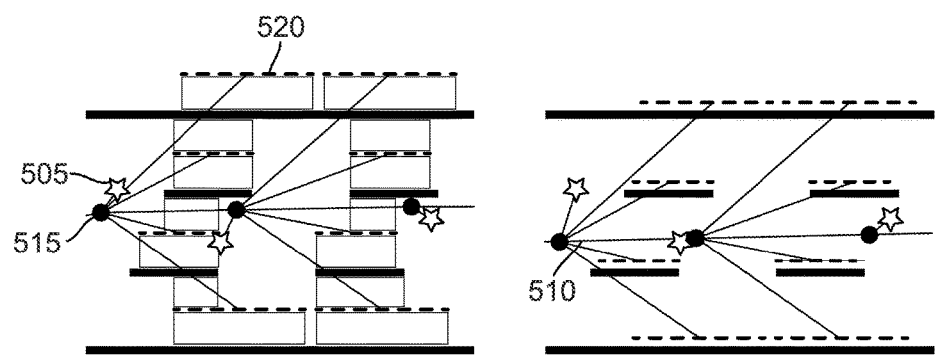
FIG. 5 is an example graph of a roadway with lane marker matches during a first iteration of the method of FIG. 3 and after several iterations of the method of FIG. 3.

FIG. 5 illustrates the initial coarse solution for a complete track by creating a graph and matching the graph to the high-definition map. On the left side of FIG. 5, a graph of GPS measurements 505 and six degrees of freedom (6-DOF) relative motion edges 510 connecting pose vertices 515 are built (without the lane marker matches). A graph optimization then finds the minimum energy solution by moving the 6-DOF pose vertices around. After this step, the pose vertices may be inaccurate by up to several meters. To tightly align the graph to the road (i.e., the camera image), matches of detected lane markers 520 to all map lane markers are added based on a matching range threshold. All potential matches within matching range may be kept, as seen on the left side of FIG. 5. In some embodiments, three dimensional lane marker detections for alignment can be computed with simple techniques such as a top-hat filter and a stereo camera setup with, for example, a symmetrical local threshold filter. A simple detector (for example, an untrained object detector) may create outliers and misdetections, but these are generally not numerous enough to adversely affect the graph alignment. However, the simple detector is replaced by the first neural net detector for further robustness improvements. In some embodiments, line segments are extracted from these detections by running a Douglas-Peucker polygonization and the resulting 3D line segments are added to the corresponding pose vertices 515 for matching. Due to uncertainty in GPS measurements 505 with respect to elevation, the matching criterion only takes into account the 2D displacement of lane markers 520 in the plane space, tangential to the earth ellipsoid. An initial matching range of 4 meters may be used to robustly handle significant deviations between GPS measurements 505 and the map frame. The matching range is iteratively reduced. Outlier matches and their bias are thereby removed, as shown in the right side of FIG. 5. This approach allows the system to deal with large initial displacements robustly.

Figure 6:
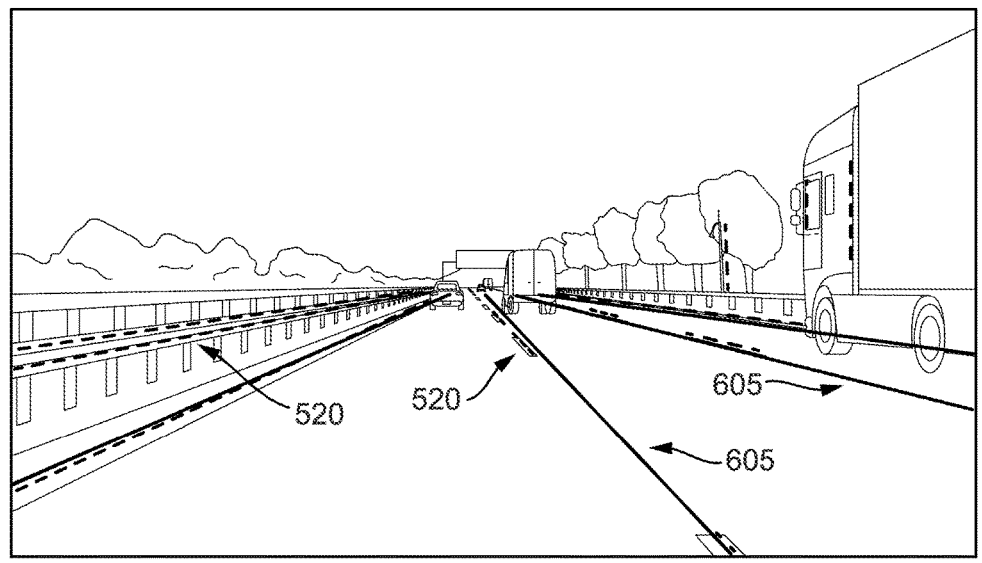
FIG. 6 is an example image of lane markers and lane marker matches prior to alignment and correction of the method of FIG. 3.

FIG. 6 illustrates an example of an initial displacement of the map lane markers 520 to the detected lane markers. In this example, the initial displacement is exaggerated for clarity of illustration. The actual initial displacement may be significantly smaller (e.g., appearing at approximately 50 meters from the vehicle 100). In FIG. 6, the remaining displacement after graph alignment of the projected lane markers 605 and the detected lane markers 520 from the simple object detector are shown. The perpendicular average distance between line segments is used as a matching criterion for a non-linear optimization that solves for the pixel-accurate corrected 6-DOF camera pose. The perpendicular average distance between line segments is used as a matching criterion for a non-linear optimization that solves for the pixel-accurate corrected 6-DOF camera pose.

To achieve pixel-accurate labels, a reprojection optimization is performed with line segments in image space. For this, the 3D lane marker map is projected to a camera image using the vertex pose from the previously optimized graph as initialization. In general, inaccurate 6-DOF motion constraints and small roll/pitch deviations will keep the initial pose from being sufficient for our purposes.

Line segments in image space are repeatedly matched based on overlap and perpendicular average distance. In some embodiments, the corrected 6-DOF camera pose is determined using a non-linear Levenberg-Marquardt optimization. After each iteration, the matching distance threshold is halved to successively remove bias from outlier matches. In one example, a 32 pixel matching range is selected to include all potential inliers and a 4-pixel matching range is selected to remove the majority of outlier matches. Once the poses are refined, all map elements may be precisely projected to generate high-quality image labels.

In one embodiment, the electronic processor 210 classifies every pixel in the image as either belonging to a lane marker or not. This approach does not necessarily require precise labels and comes with a few advantages. Using this approach, the electronic processor 210 is able to generate probability maps over the image without losing information such as lane marker width. The electronic processor 210 does not need to make assumptions about the number of traffic lanes or type of lane markers (for example, solid or dashed). Based on the neural networks pixelwise output, it is still possible to model the output using popular approaches such as splines.

Lane marker detection may be addressed as a semantic segmentation problem by employing fully convolutional neural networks. For this, a fairly small, yet highly accurate network may be used. The network may be run in real-time for every incoming camera image from the sensor 115.

Figure 7:
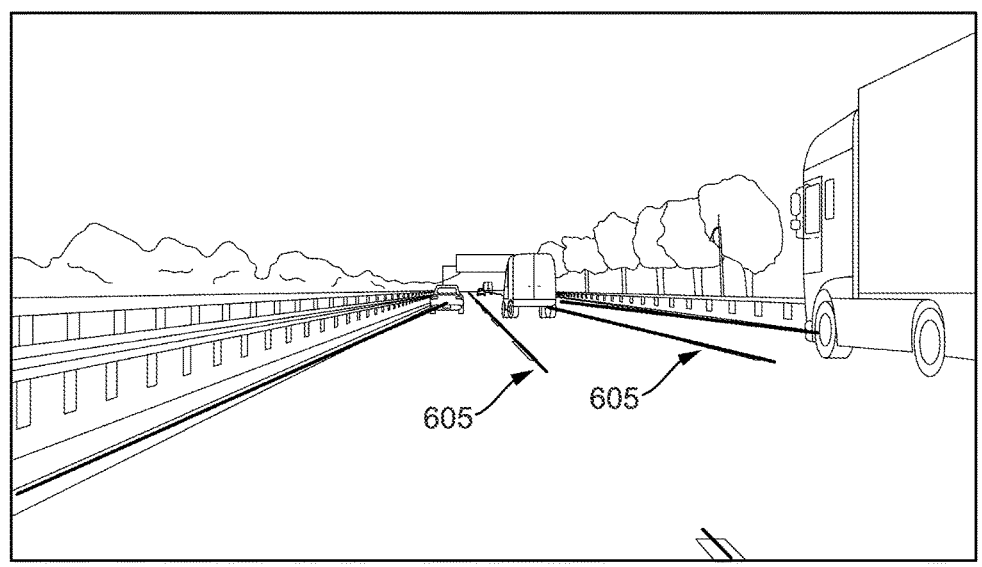
FIG. 7 is an example image of lane markers and lane marker matches after performance of the method of FIG. 3.

FIG. 7 illustrates detection of objects using the electronic processor 210 after training the electronic processor 210 using the method illustrated in FIG. 3. In particular, FIG. 7 illustrates detected objects by the neural network after being trained on the automatically generated labelled images. In this example, the detected lane markers 605 are closely matched with the actual lane markers in the camera image.

Various features, advantages, and embodiments are set forth in the following claims.

What is claimed is:

1. A method of navigation for a vehicle using automatically labeled images, the method comprising:
   loading a map that includes a first plurality of features into an electronic processor of the vehicle;
   capturing an image that includes a second plurality of features with a camera of the vehicle;
   projecting the map onto the image:
   detecting, with the electronic processor, the second plurality of features within the image;
   aligning the map with the image by aligning the first plurality of features with the second plurality of features;
   copying a label describing one of the first plurality of features onto a corresponding one of the second plurality of features to create a labelled image; and
   using the labelled image to assist in navigation of the vehicle;
   training an object detector within the electronic processor with the labelled image;
   after training the object detector, detecting the second plurality of features within a second image with the object detector to create an updated labelled image;
   correcting an alignment of the map with the second image based on the updated labelled image.

2. The method according to claim 1, further comprising training the object detector within the electronic processor with the second image.

3. The method according to claim 1, wherein the first plurality of features and the second plurality of features are lane markers.

4. The method according to claim 1, wherein loading the map that includes the first plurality of features includes loading a navigation-grade map with roadway infrastructure identified within the navigation-grade map.

5. The method according to claim 1, wherein loading the map that includes the first plurality of features includes receiving the map from a central database.

6. The method according to claim 1, wherein loading the map into the electronic processor includes downloading the map from a central server.

7. The method according to claim 1, wherein loading the map into the electronic processor includes generating the map based on input from a sensor of the vehicle.

8. A system for navigating a vehicle using automatically labeled images, the system comprising:
   a camera configured to capture an image of a roadway;
   an electronic processor communicatively connected to the camera, the electronic processor configured to
   load a map that includes a first plurality of features,
   receive the image, the image including a second plurality of features,
   project the map onto the image,
   detect the second plurality of features within the image,
   align the map with the image by aligning the first plurality of features with the second plurality of features,
   copy a label describing one of the first plurality of features onto a corresponding one of the second plurality of features to create a labelled image, and
   use the labelled image to assist in navigation of the vehicle;
   train an object detector within the electronic processor with the labelled image;
   after training the object detector, detecting the second plurality of features within a second image with the object detector to create an updated labelled image;
   correct an alignment of the map with the second image based on the updated labelled image.

9. The system according to claim 8, wherein the electronic processor is further configured to train the object detector within the electronic processor with the updated labelled image.

10. The system according to claim 8, wherein the first plurality of features and the second plurality of features are lane markers.

11. The system according to claim 8, wherein the electronic processor is further configured to load a navigation-grade map with roadway infrastructure identified within the navigation-grade map.

12. The system according to claim 8, wherein the electronic processor is further configured to receive the map from a central database.

13. The system according to claim 8, wherein the electronic processor is further configured to download the map from a central server.

14. The system according to claim 8, wherein the electronic processor is further configured to generate the map based on input from a sensor of the vehicle.

* * * * *